US005629059A

United States Patent [19]

Desai et al.

[11] Patent Number: 5,629,059
[45] Date of Patent: May 13, 1997

[54] MULTI-LAYER PACKAGING FILM AND RECEPTACLES MADE THEREFROM

[75] Inventors: Bankim B. Desai; David H. Thomson; William A. Moir, all of Mississauga, Canada

[73] Assignee: W.R. Grace & Co.-Conn., Duncan, S.C.

[21] Appl. No.: 163,451

[22] Filed: Dec. 7, 1993

[51] Int. Cl.$^6$ .............................. B65B 53/00; B27M 3/00; B32B 27/08

[52] U.S. Cl. ...................... 428/34.9; 428/35.4; 428/36.6; 428/36.7; 428/36.91; 428/213; 428/218; 428/516; 428/517; 428/518; 428/910

[58] Field of Search .................................. 428/516, 910, 428/517, 518, 213, 218, 34.9, 35.2, 35.4, 36.6, 36.7, 36.91

[56] References Cited

U.S. PATENT DOCUMENTS

| | | | |
|---|---|---|---|
| 3,090,770 | 5/1963 | Gregorian | 260/45 |
| 3,090,995 | 5/1963 | Amsden | 18/14 |
| 3,118,866 | 1/1964 | Gregorian | 260/94 |
| 3,161,629 | 12/1964 | Gorsich | 260/94 |
| 3,741,253 | 6/1973 | Brax et al. | 138/137 |
| 3,821,182 | 6/1974 | Baird, Jr. et al. | 260/91 |
| 4,064,296 | 12/1977 | Bornstein et al. | 428/35 |
| 4,076,698 | 2/1978 | Anderson et al. | 526/348 |
| 4,302,565 | 11/1981 | Goeke et al. | 526/88 |
| 4,302,566 | 11/1981 | Karol et al. | 526/125 |
| 4,306,041 | 12/1981 | Cozewith et al. | 526/65 |
| 4,364,981 | 12/1982 | Horner et al. | 428/35 |
| 4,399,180 | 8/1983 | Briggs et al. | 428/212 |
| 4,457,960 | 7/1984 | Newsome | 428/518 |
| 4,501,634 | 2/1985 | Yoshimura et al. | 156/244 |
| 4,701,432 | 10/1987 | Welborn, Jr. | 502/113 |
| 4,778,699 | 10/1988 | Knox, III | 428/349 |
| 4,801,486 | 1/1989 | Quacquarella | 428/34.9 |
| 4,863,769 | 9/1989 | Lustig et al. | 428/34 |
| 4,935,397 | 6/1990 | Chang | 502/117 |
| 4,976,898 | 12/1990 | Lustig et al. | 264/22 |
| 5,055,438 | 10/1991 | Canich | 502/117 |
| 5,057,475 | 10/1991 | Canich et al. | 502/104 |
| 5,059,481 | 10/1991 | Lustig et al. | 428/39 |
| 5,084,534 | 1/1992 | Welborn, Jr. et al. | 526/160 |
| 5,088,228 | 2/1992 | Waldie, Jr. | 43/43 |
| 5,206,075 | 4/1993 | Hodgson, Jr. | 428/216 |
| 5,241,031 | 8/1993 | Mehta | 526/348 |
| 5,266,392 | 11/1993 | Land et al. | 428/224 |
| 5,272,016 | 12/1993 | Ralph | 428/349 |
| 5,272,236 | 12/1993 | Lai et al. | 526/348 |
| 5,278,272 | 1/1994 | Lai et al. | 526/348 |
| 5,279,872 | 1/1994 | Ralph | 428/516 |
| 5,283,128 | 2/1994 | Wilhoit | 428/516 |
| 5,302,402 | 4/1994 | Dudenhoeffer et al. | 426/129 |
| 5,376,394 | 12/1994 | Dudenhoeffer et al. | 426/415 |
| 5,397,613 | 3/1995 | Georgelos | 428/36 |
| 5,397,640 | 3/1995 | Georgelos et al. | 428/349 |
| 5,403,668 | 4/1995 | Wilhoit | 428/500 |
| 5,427,807 | 6/1995 | Chum et al. | 426/393 |
| 5,491,019 | 2/1996 | Kuo | 428/213 |

FOREIGN PATENT DOCUMENTS

| | | |
|---|---|---|
| 069495 | 1/1983 | European Pat. Off. . |
| 0120503 | 10/1984 | European Pat. Off. . |
| 0416815 | 3/1991 | European Pat. Off. . |
| 0452920 | 10/1991 | European Pat. Off. . |
| 0495099 | 7/1992 | European Pat. Off. . |
| 58-37907 | of 0000 | Japan . |
| 63-175004 | of 0000 | Japan . |
| 1101315 | 1/1968 | United Kingdom . |
| 1209825 | 10/1970 | United Kingdom . |
| 90/03414 | 4/1990 | WIPO . |
| 92/14784 | 9/1992 | WIPO . |
| 93/03093 | 2/1993 | WIPO . |
| 93/08221 | 4/1993 | WIPO . |
| 93/12151 | 6/1993 | WIPO . |
| 94/07954 | 4/1994 | WIPO . |
| 94/09060 | 4/1994 | WIPO . |

OTHER PUBLICATIONS

"Determination of Branching Distributions in Polyethylene and Ethylene Copolymers", L. Wild et al, *Journal of Polymer Science*, 1982, pp. 441–455.

"Introducing VLDPE" *Plastics Technology*, p. 113.

"New Polyolefin resins emerge: Branched linear Copolymers", *Modern Plastics*, Nov. 1992, pp. 16–18.

"Enter a New Generation of Polyolefins", *Plastics Technology*, 1991.

"Novel Rheological Behavior Claimed for New–Tech Polyolefins", *Plastics Technology*, Nov. 1992, pp. 23;25.

"Dow's Patent on Elastic, Substantially Linear Olefins", The Metallocene Monitor.

RD&E Development Order Form dated Mar. 28, 1990.

"Sequence and Branching Distribution of Ethylene/1–Butene Copolymers Prepared with a Soluble Vanadium–Based Ziegler–Natta Catalyst", Nobuyuki Kuroda et al, Macromolecules, 1992, pp. 2820–2827.

"Polyolefins gain higher performance from new catalyst technologies", Robert Leaversuch, *Modern Plastics*, Oct. 1991, pp. 46–49.

"Exxon Cites Breakthrough in Olefins Polyermrization", *Modern Plastics*, Jul. 1991, pp. 61–62.

PW Technology Watch, Bernie Miller, *Plastics World*, p. 29.

"New Kind of Polyethylene Combines Flexibility, Toughness, Heat Resistance", *Plastics Technology*, Oct. 1984, p. 13.

"Ultralow density PE's are tough, Flexible, Versatile", *Plastics World*, Oct. 1984, p. 86.

Release Order, dated May 18, 1990, Cryovac.

*Primary Examiner*—Paul J. Thibodeau
*Assistant Examiner*—Stephen Sand
*Attorney, Agent, or Firm*—Rupert B. Hurley, Jr.; Leigh P. Gregory

[57] ABSTRACT

A multi-layer, oriented, heat shrinkable thermoplastic film comprising: (i) a layer composed of a blend of ethylene-vinyl acetate copolymer and a linear ethylene-alpha-olefin copolymer; (ii) a layer composed of (a) a linear ethylene-alpha-olefin copolymer; (b) a material selected from the group consisting of ethylene-vinyl acetate copolymers and ethylene-n-butyl acrylate copolymers; and (c) a narrow molecular weight linear ethylene-alpha-olefin copolymer having a density of less than 0.900 g/cc; (iii) a layer composed of a vinylidene chloride copolymer or an ethylene-vinyl acetate copolymer in which the acetate moieties have been partially or completely hydrolyzed; and (iv) a layer composed of a copolymer of ethylene-vinyl acetate or a blend of ethylene-vinyl acetate copolymer and ethylene-alpha-olefin copolymer.

29 Claims, No Drawings

MULTI-LAYER PACKAGING FILM AND RECEPTACLES MADE THEREFROM

FIELD OF THE INVENTION

This invention relates to multi-layer thermoplastic packaging films and receptacles such as pouches, bags, and casings made therefrom. In particular, this invention relates to plastic films and bags which are heat shrinkable and have improved shrink, tear, and puncture resistance properties. The films should also have good flexibility and extension properties for improved vacuum packaging.

BACKGROUND OF THE INVENTION

Shrinkable thermoplastic films have found many applications in packaging of meats, cheeses, poultry, seafood and numerous other food and non-food products. For packaging some foodstuffs, for instance meat and some cheeses, the film should include a layer that is a barrier to the passage of gases, particularly oxygen. For packaging other foodstuffs, for instance poultry and some other cheeses, and also for packaging non-food materials, no such barrier layer is required.

There is always the search for improvement in these films to give them better abuse resistance, better tear resistance, improved clarity, easier handling and better barrier properties. One film of this type is a multi-layer film having layers of polyethylene/saran/polyethylene which is disclosed in U.S. Pat. No. 3,821,182 which issued on Jun. 28, 1974 to William G. Baird, Jr. et al. The shrink and abuse resistance of such a film is improved by irradiating the film to cross-link the polyethylene layers prior to heating and orienting the film by the trapped bubble technique.

U.S. Pat. No. 3,741,253, which issued on Jun. 26, 1973 to Harri J. Brax et al, discloses a multi-ply laminate which has a first layer of cross-linked ethylene-vinyl acetate copolymer directly joined to a middle layer of a copolymer of vinylidene chloride which is joined to another ethylene-vinyl acetate copolymer layer. The ethylene-vinyl acetate copolymer (hereinafter EVA) layer has improved properties over the previously used polyethylene and, in the extrusion coating method used to produce the multi-layer film according to the Brax et al patent, the substrate EVA layer is preferably cross-linked by irradiation before the saran layer is extrusion coated thereon, thus avoiding irradiation of the saran layer. Saran (vinylidene chloride homo- or copolymer) tends to discolor under high energy irradiation.

An alternative and successful multi-layer film where a hydrolysed ethylene-vinyl acetate copolymer is used as a barrier layer instead of saran is disclosed in U.S. Pat. No. 4,064,296 which issued on Dec. 29, 1977, to Normal D. Bornstein et al. A heat shrinkable multi-layer film is formed by coextruding the hydrolysed ethylene-vinyl acetate copolymer (sometimes abbreviated "HEVA" or called ethylene-vinyl alcohol and abbreviated "EVAL" or "EVOH".) Since EVOH does not suffer from the effects of radiation a coextruded product such as EVA/EVOH/EVA can readily be cross-linked by irradiation before orientation.

Another way of improving the performance of packaging films has been to blend various polymers. U.S. Pat. No. 3,090,770, which issued on May 21, 1973 to Razmic S. Gregorian, discloses the blending of cross-linked polyethylene with non-cross-linked polyethylene to improve the clarity of a film. Such blends use differing proportions of high, low and medium density polyethylene. This patent also discloses a cross-linked polyethylene; and, U.S. Pat. No. 3,118,866, which issued on Jan. 28, 1964 to the same inventor, is directed to an ethylene composition and the process of cross-linking by chemical means. The olefin polymers and copolymers have been particularly attractive because of low cost, availability, and wide range of satisfactory characteristics for packaging films.

Recently, medium and low density linear polyethylenes have become commercially available and have begun to be used in a number of packaging applications. One early patent in this field is U.S. Pat. No. 4,076,698, which issued on Feb. 28, 1978 to Arthur William Anderson and discloses an interpolymer composed of ethylene and mono-alpha-olefinic hydrocarbons containing five to ten carbon atoms per molecule, the proportion of the mono-olefinic hydrocarbon being 3 to 7 percent of the weight of the interpolymer, with a melt index from 0.3 to 20 and a density of 0.93 to 0.94 g/cc. Linear polymers of this type are characterized by actually being an interpolymer or copolymer with another olefin and having a relatively straight molecular chain, that is, having a chain with no side branches or limited side branching. Low density versions of this type of film, where density is in the range of 0.920 to 0.926, are produced by a low pressure process, as opposed to the high pressure process which produces a branched, low density polyethylene. Linear low density polyethylene, sometimes abbreviated hereinafter as "LLDPE", has found many applications and uses as exemplified by U.S. Pat. No. 4,364,981 which issued on Dec. 21, 1982 to Jerome T. Horner and discloses an EVA/LLDPE/EVA, structure as does also U.S. Pat. No. 4,399,180 which issued on Aug. 16, 1983 to William F. Briggs et al. In U.S. Pat. No. 4,457,960 a multi-layer structure is disclosed of EVA/Saran/EVA-LLPDE-blend.

Still another polymeric material has more recently entered the market having different properties from the copolymers which comprise the LLDPE class of materials. These copolymers are known as very low density polyethylene (hereinafter abbreviated "VLDPE"). Whereas conventional polyethylenes and LLDPE have densities as low as 0.912, the VLDPE currently on the market have densities below 0.910, specifically down to about 0.860. European Published Patent Application No. 120,503 (Union Carbide), published Oct. 3, 1984, discloses a method of making VLDPE. In "Plastics Technology" magazine for September 1984 at page 113, a news item entitled "Introducing Very Low Density PE" briefly described some of VLDPE properties and stated that it's what the manufacturer ". . . calls an entirely new class of polyethylene, consisting of linear copolymers that can be produced at densities down to 0.89 or lower. What makes them special is a unique combination of properties in between those of standard PE's and polyolefinic rubbers". In the October 1984 issue of "Plastics Technology" at page 13 another article appeared entitled "New Kind of Polyethylene Combines Flexibility, Toughness, Heat Resistance". This article lists a number of the properties of VLDPE and compares them with ethylene-vinylacetate (EVA) and states that uses for this material is for squeeze tubes, bottles, hoses, tubing, drum liners and film. VLDPE is also listed as having potential as an additive. It is expected to be used as a blending resin in high density polyethylene, polypropylene, EVA, and some ethylene-propylene rubbers (EPR), with all of which VLDPE is compatible. According to the article, the first two commercially available grades are from Union Carbide. One resin, designated "DFDA-1138 NT7", has a narrow molecular weight distribution, higher toughness, clarity, and gloss and FDA clearance for food contact. The other resin is DFDA-1138 which is aimed particularly at film, has a broad molecular weight distribution, and is superior in processability. On page 15 in the same article, it is stated that "the new resins have been injection molded, extruded, blow molded, and thermoformed on standard equipment". It is noted that blown film can be extruded on systems designed either for conventional LDPE or LLDPE. However, the company generally recommends LLDPE-type screw designs in higher torque capability, especially with narrow-MWD grades. The article observes that the enlarged die gaps required by LLDPE are not required for VLDPE and that conventional blown film die gaps of 30–40 mil have proven satisfactory at blow up ratios of 2–3:1. For blown film, DFDA1137 and 1138 are said to extrude much like 2-Melt Index LLDPE or 0.5-Melt Index LDPE. An article similar to the one in "Plastics Technology" appeared in the October 1984 issue of "Plastics World" at page 86.

In the above mentioned European Patent Application a process for preparing very low density ethylene polymers in a fluidized bed is described. These ethylene polymers are classified as having a density of less than 0.91 and having a melt flow index which is preferably from 0.2 to 4.0.

The incorporation into heat shrinkable films of conventional ethylene/alpha-olefins produced by Ziegler-Natta catalyst systems is well known. Ziegler-Natta catalystic methods are commonly used throughout the polymer industry and have a long history tracing back to about 1957.

These systems are often referred to as heterogeneous since they are composed of many types of catalytic species each at different metal oxidation states and different coordination environments with ligands. Examples of Ziegler-Natta heterogeneous systems include metal halides activated by an organometallic co-catalyst, such as titanium or magnesium chlorides complexed to trialkyl aluminum and may be found in patents such as U.S. Pat. Nos. 4,302,565 and 4,302,566. Because these systems contain more than one catalytic species, they possess polymerization sites with different activities and varying abilities to incorporate comonomer into a polymer chain.

The result of such multi-site chemistry is a product with poor control of the polymer chain architecture both within the sequence of a single chain, as well as when compared to a neighbouring chain. In addition, differences in catalyst efficiency produce high molecular weight polymer at some sites and low molecular weight at others. Therefore, copolymers produced using these systems lead to polymer products which are mixtures of chains some high in comonomer and other with almost none. For example, conventional Ziegler-Natta multi-site catalysts may yield a linear ethylene/alpha-olefin copolymer having a mean comonomer percentage of 10, but with a range of 0% to 40% comonomer in individual chains. This, together with the diversity of chain lengths results in a tryl heterogeneous mixture also having a broad molecular weight distribution (MWD).

Linear low density polyethylene (LLDPE) has enjoyed great success as a raw material choice for packaging films. The term LLDPE is generally understood to describe copolymers of ethylene and one or more other alpha olefin monomers which are polymerized at low pressure using a Ziegler-Natta catalyst to achieve a density range of about 0.915 to about 0.940. Although no clear standard exists, LLDPE polymers are often marketed in subgroups of densities such as linear medium density (LMDPE), linear low density polyethylene, linear very low density (VLDPE), or linear ultra low density polyethylene (ULDPE). These classifications are for marketing use and will vary by supplier.

These materials are different from high pressure low density polyethylene (LDPE) which is generally understood in the trade as a highly branched homopolymer having a single low melting point. For example, a 0.92 density LDPE would typically have a melting point at about 112° C. while a corresponding density LLDPE would have melting point at 107°, 120°, and 125° C. The multiple melting points are commonly observed with LLDPE and are a consequence of the above mentioned heterogeneous incorporation of comonomer.

Recently a new type of ethylene copolymer has been introduced which is the result of a new catalyst technology. Examples of introductory journal articles include "Exxon Cites 'Breakthrough' in Olefins Polymerization," Modern Plastics, July 1991, p.61; "Polyolefins Gain Higher Performance from New Catalyst Technologies," Modern Plastics, October 1991, p.46; "PW Technology Watch," Plastics World, November 1991, p. 29; and "," Plastics Technology, November 1991, p. 15.

These new resins are produced using metallocene catalyst systems, the uniqueness of which resides in the steric and electronic equivalence of each catalyst position. Metallocene catalysts are characterized as having a single, stable chemical type rather than a volatile mixture of states as discussed for conventional Ziegler-Natta. This results in a system composed of catalyst positions which have a singular activity and selectivity. For this reason, metallocene catalyst systems are often referred to as "single site" owing to the homogeneous nature of them, and polymers and copolymers produced from them are often referred to as single site resins by their suppliers.

Generally speaking, metallocene catalysts are organometallic compounds containing one or more cyclopentadienyl ligands attached to metals such as hafnium, titanium, vanadium, or zirconium. A co-catalyst, such as but not limited to, oligomeric methyl alumoxane is often used to promote the catalytic activity. By varying the metal component and the cylopentadienyl ligand a diversity of polymer products may be tailored having molecular weights ranging from about 200 to greater than 1,000,000 and molecular weight distributions from 1.5 to about 15. The choice of co-catalyst influences the efficiency and thus the production rate, yield, and cost.

Exxon Chemical, in U.S. Pat. No. 4,701,432 sets out examples of which olefin catalyst systems are of the metallocene class and which are non-metallocene. The cite bis(cyclopentadienyl) dichloro-transition metal, bis (cyclopentadienyl) methyl, chloro-transition metal, and bis (cyclopentadienyl) dimethyl-transition metal as examples of metallocene catalysts, where the metals include choices such as titanium, zirconium, hafnium, and vanadium. The patent further provides examples of non-metallocene catalysts as being $TiCl_4$, $TiBr_4$, $Ti(OC_4H_9)_2Cl_2$, $VCl_4$, and $VOCl_3$.

Similarly, C. P. Cheng, at SPO 91, the Specialty Polyolefins Conference sponsored by Schotland and held in Houston, Tex. in 1991, cited $TiCl_3/AlR_2Cl$ and $MgCl_2/TiCl_4/AlR_3$ as examples of non-metallocene Ziegler-Natta catalysts and transitions metal cyclopentadienyl complexes as examples of metallocene homogeneous polyolefin catalysts.

As a consequence of the single site system afforded by metallocenes, ethylene/alpha-olefin copolymer resins can be produced with each polymer chain having virtually the same architecture. Therefore, the copolymer chains produced from single site systems are uniform not only in chain length, but also in average comonomer content, and even regularity of comonomer spacing, or incorporation along the chain.

In contrast to the above mentioned Ziegler-Natta polymers, these single site metallocene polymers are characterized as having a narrow MWD and narrow compositional distribution (CD). While conventional polymers have MWD's of about 3.5 to 8.0, metallocenes range in MWD from about 1.5 to about 2.5 and most typically about 2.0. MWD refers to the breadth of the distribution of molecular weights of the polymer chains, and is a value which is obtained by dividing the number-average molecular weight into the weight-average molecular weight. The low CD, or regularity of side branches chains along a single chain and its parity in the distribution and length of all other chains, greatly reduces the low MW and high MW "tails". These features reduce the extractables which a rise from poor LMW control as well as improve the optics by removing the linear, ethylene-rich portions which are present in conventional heterogeneous resins.

Thus, conventional Ziegler-Natta systems produce heterogeneous resins which reflect the differential character of their multiple catalyst sites while metallocene systems yield homogeneous resins which, in turn, reflect the character of their single catalytic site.

Another distinguishing property of single site catalyzed ethylene copolymers is manifested in their melting point range. The narrow CD of metallocenes produces a narrow melting point range as well as a lower Differential Scanning Calorimeter (DSC) peak melting point peak. Unlike conventional resins which retain a high melting point over a wide density range, metallocene resin melting point is directly related to density. For example, an ethylene/butene copolymer having a density of 0.905 g/cc produced using a metallocene catalyst has a peak melting point of about 100° C., while a slightly lower density ethylene/butene copolymer which was made using a conventional Ziegler catalyst reflects its heterogeneous nature with a melting point at about 120° C. DSC shows that the Ziegler resin is associated with a much wider melting point range and actually melts higher despite its lower density.

While providing improved physical properties such as optics, low extractables and improved impact, the narrow compositional distribution of some typical metallocene catalyzed resins can cause some processing difficulties. It has been found that such processing problems are avoided if some limited long chain branching is introduced. That is, a typical metallocene catalyzed ethylene alpha-olefin may be thought of as a collection of linear chains each of substantially identical length, each having approximately the same number of short chain (comonomer) branches distributed at regular intervals along that length. Splicing an abbreviated linear chain with the same regular comonomer distribution onto each of the linear chains, or at least some of the chains in the collection, yields an ethylene alpha-olefin with essentially all of the physical properties of the original copolymer, but which an improved "body" or melt strength for improved processability including improved extrudability, orientation speeds and susceptibility to irradiation.

In recent years several resin suppliers have been researching and developing metallocene catalyst technology. The following brief discussion should be viewed as representative rather than exhaustive of this active area of the patent literature.

Dow in EP 416,815 disclosed the preparation of ethylene/ olefin copolymers using monocyclopentadienylsilane complexed to a transition metal. The homogenous ethylene copolymers which may be prepared using this catalyst are said to have better optical properties than typical ethylene polymers and be well suited for film or injection molding.

As will be shown below, it has been found that resins produced by the Dow process exhibit improved physical properties characteristic of single site catalyzed resins but also possess a processability similar to that of conventional Ziegler-Natta copolymers. It is believed that the Dow metallocene resins possess the limited long chain branching discussed above.

Welborn in Exxon U.S. Pat. No. 4,306,041 discloses the use of metallocene catalysts to produce ethylene copolymers which have narrow molecular weight distributions.

Chang, in Exxon U.S. Pat. No. 5,088,228 discloses the production of ethylene copolymers of 1-propene, 1-butene, 1-hexane, and 1-octene using metallocene catalysts.

Exxon in U.S. Pat. No. 4,935,397 discloses the production of ethylene copolymers using metallocene catalysts to manufacture polymer suitable for injection molding or thermoforming.

Welborn, in Exxon U.S. Pat. No. 5,084,534 discloses the use of bis(n-butylcyclopentadienyl) zirconiumdichloride to produce high molecular weight polyethylene having a polydispersity of 1.8 and a density of 0.955 g/cc.

In Exxon U.S. Pat. No. 3,161,629 a cyclopentadienyl complex is disclosed which may be used to produce polyolefins having controlled molecular weight and density suitable for use in extrusion or injection molding.

Canich in Exxon U.S. Pat. Nos. 5,055,438 and 5,057,475 discloses the use of mono-cyclopentadienyl catalysts having a unique silicon bridge which may be employed to select the stereo-chemical structure of the polymer. Catalysts such as methyl, phenyl, silyl, tetramethylcyclopentadienyl-tertbutylamido zirconium dichloride may be used to produce polyethylene and ethylene copolymers suitable for films and fibers.

Mitsui Toatsu in JP 63/175004 employed bis (cyclopentadienyl) ethoxy-ZrCl to prepare homogenous ethylene copolymers.

Mitsubishi in JP 1,101,315 discloses the use of bis (cyclopentadienyl)ZrCl$_2$ for the preparation of ethylene butene copolymers.

It should be noted that at least some previously available ethylene based linear polymers approximated the physical and compositional properties achieved by the present metallocene catalyzed polyolefins. For example, in "Sequence and Branching Distribution of Ethylene/1-Butene Copolymers Prepared with a Soluble Vanadium Based Ziegler-Natta Catalyst," *Macromolecules*, 1992, 25, 2820–2827, it was confirmed that a soluble vanadium based Ziegler-Natta catalytic system VOCl$_3$/Al$_2$(C$_2$H$_5$)$_3$Cl$_3$, acts essentially as a single site catalyst although VOCl$_3$ is not a metallocene. Homogeneous copolymers produced by such a catalyst system have been commercially available for several years. An example of such are the resins sold under the trade-mark Tafmer(TM) by Mitsui.

U.S. Pat. No. 4,501,634 to Yoshimura et al is directed to an oriented, multilayered film which includes a Tafmer as a blend component in at least one layer.

Japanese Kokoku 37307/83 to Gunze Limited was directed to a heat-sealable biaxially oriented composite film wherein the heat seal layer contains Tafmer in a blend.

The foregoing patents disclose homogeneous ethylene alpha-olefins having densities below 0.90 g/cc.

A successful and useful film is made according to the process shown in U.S. Pat. No. 3,741,253 mentioned above. A heat shrinkable bag can be made from such film which has wide application, particularly for meat, poultry, and some dairy products. Heat shrinkable polymeric films have gained widespread acceptance for packaging meat, particularly fresh meat and processed meat. Bags made from the heat shrinkable film are sealed at one end with the other end open and ready to receive a meat product. After the cut of meat is placed in the bag, the bag will normally be evacuated and the open end of the bag closed by heat sealing or by applying a clip, e.g., of metal. This process is advantageously carried out within a vacuum chamber where the evacuation and application of the clip or heat seal is done automatically. After the bag is removed from the chamber it is heat shrunk by applying heat. This can be done, for instance, by immersing the filled bag into a hot water bath or conveying it through a hot water shower or a hot air tunnel, or by infra red radiation.

In the usual distribution chain, a whole primal or sub-primal is packaged within shrink bags of this type. The meat within the bag will travel from a central slaughterhouse where it has been packaged to a retail supermarket where the bag will be opened and the meat will be cut for retail portions. Thus, the bags of this type must satisfy a number of requirements which are imposed by both the slaughterhouse or packing house and by the bag user. Furthermore, often the bag is placed in the showcase at the retail supermarket for special promotions when a whole loin, for example, is to be sold to a consumer. For retail use, particularly, it is desirable to have an attractive package. This requires relatively complete shrinkage of the bag around the product, so that the bag is not wrinkled and blood and juices are not trapped in the folds of the wrinkles.

Another important characteristic of a bag is the capability of the bag to physically survive the process of being filled, evacuated, sealed, closed, heat shrunk, boxed, shipped about the country, unloaded, and stored at the retail supermarket. This type of abuse rules out many polymeric films.

Another feature required by bags used for the foregoing described application is that the bag must also be strong enough to survive the handling involved in moving packaged meat which may weigh 100 pounds or more or large chunks of cheese weighing 60 lbs. or more. In particular, when the chunk of meat or cube of cheese is pushed into the bag its bottom seal must withstand the force of the meat or cheese as it hits the seal. Also, in bags that are made by folding a sheet with the fold as the bottom of the bag and by sealing the sides, seal strength is an important factor.

One of the more common hazards in packaging and distributing products in flexible packaging materials is the hazard of the material receiving a puncture which will release the vacuum inside the bag and allow oxygen to enter. Anything from the application of the clip to the presence of a bone in the meat can cause a puncture.

Canadian Patent Application Serial No. 502,615 of Ferguson et al discloses multi-layer thermoplastic barrier film comprising:
 (a) a layer comprising very low density polyethylene having a density of less than 0.910 g/cc,
 (b) a barrier layer comprising a material selected from the group consisting of: 1) copolymers of vinylidene chloride and 2) hydrolyzed ethylene-vinyl acetate copolymers; and
 (c) a thermoplastic polymer layer, said layer being on the side of the barrier layer opposite to that of layer (a); the multi-layer film being oriented and heat shrinkable at a temperature below 100° C. This film has been used to make heat-shrinkable bags to contain meat, cheese, and the like. A commercial product, within the scope of this patent application, that has met with success is in fact composed of four layers. An inner layer is formed from a blend of 90% of an EVA copolymer containing 6% vinyl acetate and 10% of an ethylene-alpha-olefin copolymer of density 0.912 g/cc. A second layer is composed of a blend of 80% of linear ethylene-alpha-olefin copolymer of density 0.912 g/cc and 20% of an EVA copolymer containing 20% vinyl acetate. A third, barrier layer is composed of a copolymer of vinylidene chloride. A fourth, outer layer is composed of a blend of 91% of an EVA copolymer containing 9% vinyl acetate and 9% of linear ethylene-alpha-olefin copolymer of density 0.912 g/cc. This film is prepared by co-extruding the two inner layers to form a tape of circular cross-section, irradiating to cause cross-linking, coextruding the barrier layer and the outer layer onto the outside wall of the tape, biaxially stretching the product, cutting it into lengths and heat-sealing each length at one end to form a heat-sealable, heat-shrinkable bag. The four layer wall of the bag has a thickness of about 2.4 mil.

Although this commercial product works well, there are some difficult applications for which this product could be improved upon, for instance packaging picnic hams, and improvements are still sought in the areas of abuse resistance and shrinkage. Abuse is the term used to describe the treatment that a bag is subjected to when it is packed in a high speed packing operation for instance in a meat packing plant. A bag must withstand the impact of the meat entering the bag, without that causing any breakage in the heat seal at the initially closed end of the bag. If the meat has projecting bone the bag must withstand the impact of the bone without puncturing. The bag when evacuated and sealed must with stand hydrostatic pressures of blood and juices from the meat.

One approach to improving abuse resistance is to increase the thickness of the laminate film. It has been expected that this approach would lead to improvement in abuse resistance only at the expense of deterioration in other important properties, and would therefore be unacceptable. An increase in the thickness leads to a reduction of the elasticity of the film which results in increased stiffness of the film. This increased stiffness leads to formation of creases and increases the risk of crease fractures, resulting in increased leakage in handling. Another disadvantage is reduced heat shrinkage. It is desirable that the film shall have high heat shrinkage for several reasons. Film with high heat shrinkage encloses the packed foodstuff more closely to yield a packed product with greater aesthetic appeal, which is particularly important at the retail level. Also, high shrinkage reduces the formation of ears in the package. Regions of a sealed and heat shrunk package that are not separated by the packed material are referred to as ears, that is regions where the two inner surfaces of the bag are in contact with each other. Ears are unsightly, and for this reason should be as small as possible. Also ears project and with large ears there is increased risk that ears will catch on projections encountered during handling and be torn, resulting in a leaking pack.

There has now surprisingly been found a film composition with enhanced tensile strength, interply adhesion and resistance to tear propagation.

SUMMARY OF THE INVENTION

The invention provides a multi-layer, oriented, heat shrinkable thermoplastic film comprising:
 (i) a layer composed of an ethylene-vinyl acetate copolymer or a linear ethylene-alpha-olefin copolymer or a blend of an ethylene-vinyl acetate copolymer and a linear ethylene-alpha-olefin copolymer; and (ii) a layer composed of a blend of (a) a linear ethylene-alpha-olefin copolymer; (b) a material selected from the group consisting of ethylene-vinyl acetate copolymers, ethylene-butyl acrylate copolymers, ethylene-methyl acrylate copolymers, ethylene-methyl methacrylate copolymers, ethylene-acrylic acid copolymers, ethylene-methacrylic acid copolymer and ethylene-carbon monoxide copolymers; and (c) a narrow molecular weight linear ethylene-alpha-olefin copolymer having a density of less than 0.9 g/cc, preferably 0.870 to less than 0.900 g/cc, preferably 0.870 to 0.885 g/cc.

Among preferred features of the invention are:

a) a film wherein layer (i) is a blend of an ethylene-vinyl acetate copolymer and a linear ethylene-alpha-olefin copolymer;

b) a film wherein the linear ethylene-alpha-olefin copolymer present in layer (i) has a density of about 0.920 g/cc;

c) a film wherein layer (ii) has a substantially greater thickness than layer (i);

d) a film which comprises a further layer of material resistant to oxygen transmission; this material may be a copolymer of vinylidene chloride, especially a copolymer of vinylidene chloride with vinylchloride or methyl acrylate. Alternatively the material resistant to oxygen transmission is a copolymer of ethylene-vinyl acetate in which the acetate-moieties have been partially or completely hydrolyzed. This may be mixed with the vinylidene chloride copolymer. If the material resistant to oxygen transmission is a copolymer of ethylene-vinyl acetate in which the acetate moieties have been partially or completely hydrolyzed to give ethylene-vinyl alcohol copolymer then adhesive layers will be required to make this layer adhere to adjacent layers thereby giving a film with a further two (adhesive) layers. Typical adhesives include acrylic acid modified ethylene-vinyl acetate, anhydride modified ethylene-vinyl acetate and methacrylate resins;

e) a film which comprises a further layer of a thermoplastic polymeric material. The further layer may comprise a copolymer of ethylene-vinyl acetate;

f) a film which comprises;

(i) a layer composed of a blend of ethylene-vinyl acetate copolymer and a linear ethylene-alpha-olefin copolymer preferably having a density of below about 0.920 g/cc;

(ii) a layer composed of (a) a linear ethylene-alpha-olefin copolymer preferably butene, hexene or octene; (b) a material selected from the group consisting of ethylene-vinyl acetate copolymers and ethylene-n-butyl acrylate copolymers; and (c) a narrow molecular weight linear ethylene-alpha-olefin copolymer having a density of less than 0.900 g/cc;

(iii) a layer composed of a vinylidene chloride copolymer or an ethylene-vinyl acetate copolymer in which the acetate moieties have been partially or completely hydrolyzed; and (iv) a layer composed of a copolymer of ethylene-vinyl acetate or a blend of ethylene-vinyl acetate copolymer and ethylene-alpha-olefin copolymer preferably in the proportion 91%:9% by weight, particularly 92.5%:7.25% by weight. The ethylene-alpha-olefin copolymer commonly will have a density of greater than 0.915 g/cc.

Multilayer films of the invention may comprise as many as, for example, nine layers and may include, for example, three or four adhesive layers for reasons outlined above.

Preferably in such a film in layer (i) the ethylene-vinyl acetate copolymer has a vinyl acetate content of about 6% and the blend is composed of about 90% by weight of the ethylene-vinyl acetate copolymer and about 10% by weight of the linear ethylene-alpha-olefin copolymer.

Also, preferably layer (ii) (c) comprises a linear ethylene-alpha-olefin copolymer having a density of about 0.885 g/cc.

Further preferred is a film wherein layer (ii) includes about 50% by weight of the layer of the linear ethylene-alpha-olefin copolymer, about 20% by weight of the layer of an ethylene-n-butyl acrylate copolymer and about 30% by weight of the layer of the linear ethylene-alpha-olefin copolymer having a density of less than 0.900 g/cc. A ethylene-n-butyl acrylate copolymer which is preferred has a butyl acrylate content of about 18.5% by weight.

Alternatively layer (ii) includes an ethylene-vinyl acetate copolymer that has a vinyl acetate content of about 18% by weight.

In a further preferred embodiment layer (iii) is composed of a copolymer of vinylidene chloride and methyl acrylate and layer (iv) is composed of an ethylene-vinyl acetate copolymer or a blend. In a particularly preferred embodiment in layer (iii) the copolymer of vinylidene chloride and methyl acrylate contains about 91.5% by weight of vinylidene chloride and about 8.5% by weight of methyl acrylate and in layer (iv) the ethylene-vinyl acetate copolymer has a vinyl acetate content of about 9%.

One preferred use for film of the invention is in receptacles such as bags or pouches that are used to contain meats, some cheeses, seafood, and the like, the receptacle being heat shrunk about the packaged foodstuff. For this particular use the film contains an extra layer that serves as a barrier to the transmission of gases, particularly oxygen, and also a layer to protect this barrier layer against abrasion. Thus, in a preferred embodiment the invention provides a film composed of four layers. Layer (1) is as defined above and when the film is used to form a receptacle to contain foodstuff this layer will form the interior surface and also be in direct contact with the foodstuff. This layer will also provide the seal when two sides of the receptacle are heat sealed together, so this layer is sometimes referred to as the sealant layer. Layer (2) is preferably substantially thicker than layer (1). Layer (2) is sometimes known as the core or substrate layer. The third layer provides the oxygen barrier and is therefore known as the barrier layer. The fourth layer provides abrasion resistance and is therefore sometimes known as the abuse layer.

The first layer, or sealant-layer, is preferably composed of about 90% of an ethylene-vinyl acetate (EVA) copolymer and about 10% of a linear ethylene-alpha-olefin copolymer. This latter copolymer preferably has a density of greater than 0.915 g/cc. The EVA copolymer preferably has a vinyl acetate content of about 6%.

Useful operable ranges of the three components of the core or substrate layer are as follows:

| Component of Layer | Preferred range (by weight) | Particularly preferred proportions (by weight) |
|---|---|---|
| (a) linear ethylene-alpha-olefin copolymer, density preferably greater than 0.915 g/cc | 30–70% | 50% |
| (b) ethylene-vinyl acetate copolymer or ethylene-n- | 15–20% | 20% |

| Component of Layer | Preferred range (by weight) | Particularly preferred proportions (by weight) |
| --- | --- | --- |
| butyl acrylate copolymer or equivalent | | |
| (c) linear ethylene-alpha-olefin copolymer having density of less than 0.900 g/cc. | 20–50% | 30% |

The third layer is resistant to oxygen transmission and is also known as the barrier layer. One suitable material is an EVA copolymer that contains at least 35% of VA prior to hydrolysis and has been partially (at least 50% and preferably at least 90%) or completely hydrolysed to convert acetate ester moieties to hydroxy groups. Such a hydrolyzed EVA copolymer is sometimes known as an EVOH. More preferred are homopolymers of vinylidene chloride and copolymers containing at least about 80% of vinylidene chloride, known as saran. The comonomer can be for example, vinyl chloride, methyl acrylate, methyl methacrylate, acrylonitrile or butyl rubber, of which vinyl chloride or methyl acrylate is preferred.

The properties of the material used in the fourth abuse layer are not particularly critical, except that the material should be clear, resistant to abrasion and able to accept ink for printing. Many thermoplastic materials are suitable, and mention is made of ethylene polymers and copolymers, especially EVA copolymers. Blends of such materials can be used, and ethylene-propylene rubber (EPR) can be incorporated in such blends.

The film of the invention can be used at the same gauge as the current commercial product, i.e., 2–4 mil. A common thickness is 2.4 mil. For premium applications, for instance packing bone-in meats such as bone-in hams, it is preferred to use film of a thicker gauge, about 3.5 to 4.0 mil.

Advantageously, the linear ethylene-alpha-olefin copolymer material may be cross-linked. A preferable method of cross-linking is by irradiation although the material may be cross-linked by chemical means. Also, in certain instances where the barrier material is EVOH, it may be advantageous to cross-link the barrier material. As EVOH does not adhere as well as saran to the other layers of the film, if EVOH is used as the barrier layer it may be necessary to use it sandwiched between two thin layers of materials that have good adhesive properties and resistance to moisture, for example EVA.

In still another aspect, the present invention is a seamless tubular film made from any one of the multi-layer film combinations set forth above by a tubular or annular extrusion or coextrusion process.

In yet another aspect, the invention provides a receptacle such as a bag or pouch made from the film of the invention.

DEFINITIONS

Polyvinylidene chloride, sometimes called saran, means vinylidene chloride usually copolymerized with at least one other monomer which includes, but is not limited to, vinyl chloride, $C_1$ to $C_8$ alkyl acrylates (such as methyl acrylate), $C_1$ to $C_8$ methacrylates and acrylonitrile. Saran is then plasticized for better processability.

The term "LLDPE" refers to linear low density polyethylene which is generally understood to include that group of ethylene/alpha-olefin copolymers having limited side chain branching when compared with non-linear polyethylenes and which fall into a density range of 0.916 to 0.940 g/cc. The alpha-olefin copolymers are typically butene-1, pentene-1, hexane-1, octene-1, etc.

The term "ethylene-vinyl acetate copolymer" (EVA) as used herein refers to a copolymer formed from ethylene and vinyl acetate monomers wherein the ethylene units are present in a major amount and the vinyl-acetate units are present in a minor amount. More preferably, when using an EVA copolymer the amount of vinyl-acetate may range from about 5 to about 20% When EVA is followed by a present figure this refers to vinyl acetate content as percent by weight of EVA. It is preferred that EVA layers that may come in contact with grease from cooked meats, i.e., EVA in the sealant layer shall have a vinyl acetate-content towards the lower end of this range.

The compositions can include additional materials that do not affect their essential character, for instance stabilizers, pigments, processing aids such as waxes, deodorizing agents anti-static agents, anti-blocking agents, plasticizers and the like.

A "heat shrinkable" material is defined herein as a material which, when heated to an appropriate temperature above room temperature (to, for example 96° C.) will have a free shrink of 10% or greater in at least one linear direction. Shrink properties are after measured at 85° C.

The term alpha-olefin copolymers as defined herein refers to the newer copolymers of ethylene (or propylene or butene) with one or more comonomers selected from $C_3$ to about $C_{10}$ alpha-olefins but especially comprises ethylene copolymers with $C_4$ to about $C_{10}$ alpha-olefins such as butene-1, pentene-1, hexane-1, octene-1, and the like in which the polymer molecules comprise long chains with few side chains or branches and sometimes are referred to as linear polymers. These polymers are obtained by low pressure polymerization processes. This copolymer is sometimes called "low pressure", low density polyethylene thereby referring to the polymerization process which produces it. The copolymer can contain a small amount, usually up to about 10 mol percent, of a conjugated or non-conjugated diene, for example butadiene, 1,-hexadiene, 1,5-hexadiene, vinylnorbornene, ethylidenenorbornene or dicyclopentadiene. The side branching which is present will be short as compared to non-linear polyethylenes. The molecular chains of a linear polymer may be intertwined, but the forces tending to hold the molecules together are physical rather than chemical and thus may be weakened by energy applied in the form of heat. The ethylene alpha-olefin polymer has a density in the range from about 0.910 g/cc to about 0.940 g/cc, more preferably in the range of from about 0.912 g/cc to about 0.928 g/cc for film making purposes. The melt flow index of these polyethylenes generally ranges from between about 0.1 to about 10 grams per ten minutes and preferably between from about 0.5 to about 3.0 grams per ten minutes (ASTM D 1238). The lower density alpha-olefin copolymers as referred to herein, such as ethylene alpha-olefin copolymers have a density from less than about 0.910 g/cc to about 0.860 g/cc, or even lower. In the core or substrate layer of this invention the alpha-olefin copolymer should have a density below about 0.90 g/cc, preferably about 0.885 g/cc, be more homogeneous than traditional polymers of this type and have a narrower molecular weight range.

Recently, a new type of ethylene-based linear polymers has been introduced. These new resins are produced by metallocene catalyst polymerization and are characterized by narrower or more homogeneous compositional properties, such as molecular weight distribution, than resins produced by more conventional metallic catalyst polymerization systems (see detailed discussion above). Conventional metallic catalyst polymerization systems have discrete catalyst composition differences which are manifested as different catalyst reaction sites with each site having different reaction rates and selectivities. Metallocene catalyst systems are characterized as a single identifiable chemical type which has a singular rate and selectivity. Thus, the conventional systems produce resins that reflect the differential character of the different catalyst sites versus metallocene systems that reflect the single catalytic site. However, it should be noted that at least some previously available ethylene-based linear polymers approximated the physical and compositional properties achieved by the present metallocene catalyzed polyolefins. That is, traditional metallic catalyzed polymerization processes operating at low reaction rates can produce relatively homogeneous resins that compare favourably with the homogeneity of metallocene catalyzed resins. An example of such are the resins sold under the trade-mark Tafmer by Mitsui.

DETAILED DESCRIPTION

A preferred method of making the film of the present invention is that according to the process outlined and described in U.S. Pat. No. 3,741,253 (Brax et al). In this process the first sealant layer and the second substrate layer of the film are coextruded through a tubular extruder whose die is modified in known manner to handle very low density polyethylene resin to form a tubular tape or film. The extruded tube has a diameter in the range of about 1½ to 6 inches (about 40 to 153 mm) with a wall thickness of 19 to 31 mils (about 500 to 800 microns) as it leaves the die. After leaving the die the substrate is cooled and flattened through nip, haul-off rolls. At this point it may be sent through an irradiation vault where it is irradiated by high energy electrons. Depending on the characteristics desired, this dosage can vary from 2 to 20 MR, but is preferably about 4.5 MR.

The irradiation has the effect of enhancing cross-linking and thereby enhancing adhesion between the layers composing the film of the invention. It is possible to include a cross-linking enhancer in the material. Suitable cross-linking enhancers are mentioned on page 7 of Canadian Patent No. 1,125,229.

If EVOH is used as the barrier layer this can be extruded onto the tube prior to the irradiation step. If the barrier layer is a vinylidene chloride homopolymer or copolymer it is normally preferred to irradiate prior to the application of the barrier layer, as vinylidene polymers are discoloured by irradiation. The extent of discolouration depends upon the comonomer and the extent of irradiation. Vinylidene chloride-methyl acrylate copolymers discolour less readily than vinylidene chloride-vinyl chloride copolymers.

After leaving the irradiation vault the substrate tube is again inflated and sent through a tubular extrusion coating die where, in a coextrusion process, it receives a coating of vinylidene chloride copolymer and layer of ethylene vinyl acetate copolymer or blend. After receiving the final coating, the film is cooled, collapsed and rolled up. It is now a four layer tubular tape having a wall thickness of approximately 700 µm (approximately 27.5 mils). The sealant layer is approximately 90 µm in thickness, the substrate layer is approximately 400 µm in thickness, the barrier layer is approximately 60 µm in thickness and the abuse layer is approximately 150 µm in thickness.

This tape is subsequently unrolled, fed through a bath of hot water held at 205° to 210° F., preferably close to 210° F., and as it leaves the hot water it is inflated and blown into thin tubing where its wall thickness will preferably be about 30 to 150 microns. This is the trapped bubble technique which is well known in the art. The film is rapidly cooled to set the orientation and then rolled up for further processing.

One further processing step can be taken to make end seal bags by transversely sealing and severing across the seamless tubular film as it is laid flat to make individual bags. Side sealed bags may be made by slitting the seamless tubular film along one of its edges after which it is transversely sealed and severed into bags. The side seals are the sealing and severing seams and the bottom of the bag is the unslit edge of the film.

Other bag and pouch making methods known in the art may be readily adapted to making receptacles from the multi-layer film of the present invention.

Film of the present invention is particularly advantageous when used in the form of bags for packaging meat with projecting bones. The packaging of meat with projecting bones is a constant problem, as the bone, which in uncooked meat can "float" and is therefore somewhat mobile, tends to puncture the bag. A common but unsatisfactory solution to this problem is to use a patch that is located over the projecting bone to enhance puncture resistance. It has surprisingly been found that with the film of the present invention the thickness used can be increased, thereby enhancing puncture resistance, without the expected disadvantages of loss of heat shrink properties and loss of clarity of the film. Furthermore, the film has a slightly softer feel to it than other known films and it appears to "give" somewhat but not puncture in situations where other materials puncture.

It has been found, and is demonstrated in examples below that when used under normal production conditions the number of unsatisfactory bags (leakers) is reduced. Inspection for leakers takes place when bags leave the heat-shrinking operation (pack off) in the meat packing plant. Leakers discovered at this stage are stripped of the leaking bag, the bag is discarded and the meat is immediately repacked. The cost of bag failure at this stage is therefore not particularly great.

The substrate film of linear ethylene-alpha-olefin copolymer may be extruded as a monolayer substrate or coextruded as a multi-layer substrate and then irradiated depending upon the desired characteristics of the final film. Furthermore, additional layers may be extrusion coated upon the inflated substrate so that films having 5, 6 or more layers result.

Multilayer film is defined as the film comprising of more than one layer. Depending on the end use of a particular product the film structure is defined. It could be two or more layers based on the expected performance of the product.

The following factors are very important while structuring a multilayer formulation:

| | |
|---|---|
| Barrier Properties | - Oxygen and/or Moisture |
| Mechanical/physical properties | - Puncture resistance/Impact strength, etc. |
| Free shrink properties | - % Shrink |
| Seal characteristics | - Hot tack, seal through contamination |
| Stress crack resistance | - Effect of grease, environment, cryogenic conditions, etc |
| Abrasion/abuse | - Physical abrasion |
| Machinability | - Compatibility to filing |

-continued

| | |
|---|---|
| Cost | machines<br>- Competitive cost |
| Compatibility | - Good bond strength between layers to give integrity |
| Others | - Environmental and food laws. |

A product is usually designed and developed based on the criteria as listed above. Number of layers are thus determined depending on the customer's needs and the performance levels expected from the product.

The thickness of each layer and total thickness of the product depend largely on the properties desired, optimum cost to benefit ratio and the limitation of the equipment process.

Thickness Range

| Layer | Range (microns) | Preferred (Typical T gauge) | Most Preferred (Formulation Z670) |
|---|---|---|---|
| Sealant (inner) | 5–20 | 10 | 10 |
| Substrate (core) | 15–85 | 35 | 50 |
| Barrier (coated) | 5–25 | 5 | 8 |
| Abuse (outer) | 10–35 | 15 | 20 |
| Total | 30–150 | 60 | 88 |

The invention is further illustrated in the following examples.

As a standard for comparison a film denoted as Z608 or B747 was used. Physical properties compared include tensile strength, tear propagation, interply adhesion, gauge control and productivity.

Z608 (5747) film comprises:

Sealant layer: blend of 90% EVA with 6% VA content and 10% linear ethylene-alpha-olefin copolymer of density 0.920 g/cc (Dowlex* 2045, available from Dow Chemical Company).
*Trade-Mark Substrate (core) layer: blend of 80% of linear ethylene-alpha-olefin copolymer of density 0.905 g/cc (Attane* 4203 available from Dow Chemical Company) and 20% of EVA with 18% VA content.
*Trade-Mark Barrier layer: 96% of a copolymer composed of 91.5% vinylidene chloride and 8.5% methyl acrylate, and 4% of epoxidized soya bean oil plasticizer, plus Irganox* 1010 antioxidant.
*Trade-Mark Outer layer: 100% EVA copolymer with 9% VA content (this layer may include 5% of masterbatch containing usual additives including antioxidant, antiblocking agent, etc. if required).

In developing new formulations to compare with Z608 (B747) the resins/blends and the layer thickness of outer, inner and barrier layers were not changed to make such comparison easier.

The core layer being the principal contributory layer in imparting major inventive properties, was modified and only details of this layer are given in the examples. The developmental work was divided mainly in three stages:

Evaluation of Processing Conditions—viz. Temperature Profile, Back Pressure in extruders, Cooling, Motive Load, Rates & Yields.

Evaluation of Desired Physical Properties in different blends and thicknesses.

Final Assessment & Pilot Plant Run.

In the Examples which follow the following terms are used.

Tafmer is the trade name for the generically known Ethylene/Alpha-Olefin Copolymer manufactured by Mitsui Petrochemical Industries Ltd. Ethylene/Alpha-Olefin Copolymer is broadly classified in two basic categories, viz. crystalline and amorphous.

Crystalline grade have the nomenclature with a prefix "A", amorphous grades have the nomenclature with a prefix "P".

P-0480—Amorphous grade with density 0.870 gms/cc.

A-1085—Crystalline grade with density 0.885 gms/cc.

Other linear ethylene-alpha-olefin copolymers which are available and can be employed in films and bags of the invention include:

(a) "Constrained Geometry Catalyst Technology" resin (CGCT) available from Dow;

(b) "Single-Site" Catalyzed (metallocene catalyst) resins (SSC) available from Exxon.

These resins have densities in the range of 0.860 g/cc to less than 0.900 g/cc. Resins of these types have Narrow Molecular Weight Distribution (NMWD) and Composition Distribution (CD). The molecular weight range is narrower than prior art resins and there is a narrow distribution of types of comonomers found as side chains to the main ethylene chain.

Bynel CXA 3101—an acid modified EVA copolymer used in Example 1. It was found not to give as good results as ethylene-n-butyl acrylate (see Example 3).

EXAMPLE 1 (Z665) (Z666)

| | Core Layer | Results (as compared to Z608) |
|---|---|---|
| 50% | LLDPE (OCTENE)/Dowlex 2045.03 | - comparable Tensile Strength |
| 30% | Ethylene-α-Olefin TAFMER Copolymer/A1085/ (TAFMER PO480) | - favourable shrink, elongation & tear propagation |
| 20% | Acid Modified Eva Polymer/ (Bynel CXA 3101) | - marginally lower puncture resistance<br>- adequate Interply Adhesion (Substrate-Barrier) |

Note:
Z665—TAFMER P-0480 in core layer
Z666—TAFMER A-1085 in core layer

EXAMPLE 2 (Z667) (COMPARATIVE EXAMPLE) (Z668)

| | | |
|---|---|---|
| 70% | LLDPE (OCTENE)/ Dowlex 2045.03 | - Practically no Interply Adhesion |
| 30% | Ethylene-α-olefin TAFMER Copolymer/A-1085 Tafmer R0480- | - Tensile, Puncture & Other Mechanical Properties lower than Z665/Z666<br>- Z668 found impossible to rack coupled with a few other process problems |

Note:
Z667—TAFMER P-0480 in core layer
Z668—TAFMER A-1085 in core layer

EXAMPLE 3 (Z669) (Z670)

| | | |
|---|---|---|
| 50% LLDPE (OCTENE/Dowlex 2045.03 | | - Comparable Tensile Strength, Puncture Resistance, Tear Propagation and Shrink |
| 30% Ethylene-α-olefin TAFMER copolymer/A-1085/ TAFMER P-0480 | | |
| 20% Ethylene-n-butyl acrylate | | - Lower Modulus of Elasticity resulting into superior elongation properties |
| | | - Improved Interply Adhesion |
| | | - Higher Energy to break |

Note:
Z669—TAFMER P-0480 in core layer
Z670—TAFMER A-1085 in core layer
Note: The properties compared pertain to formulations of TAFMER A-1085 grade.

Z670 modified with Ethylene-α-olefin copolymer and n-Butyl Acrylate Copolymer resins offer better properties related to the performance of the package.

Mechanical & Adhesion properties are derived from a blend of the core layer components whereas improved shrink and extension properties can be attributed to linear ethylene-α-olefin copolymer Resin.

The relative thicknesses of the layers are as follows:

| Layer | Resin/Blend (%) | Layer Thickness (%) |
|---|---|---|
| SEALANT (INNER) | 90% (EVA-6%)<br>10% (LLDPE/OCTENE) | 11.76 |
| SUB-STRATE (CORE) | 50% (LLDPE/OCTENE)<br>30% (LINEAR ETHYLENE/-α-OLEFIN-COPOLYMER<br>20% (ETHYLENE n-BUTYL ACRYLATE) | 55.56 |
| BARRIER (COATED) | 100% PLASTICIZED PVDC | 8.50 |
| ABUSE (OUTER) | 100% (EVA - 9%) | 24.18 |
| | | 100.00 |

The new formulation offers high abuse and high extension properties as well as high shrink.

Ethylene/Alpha-Olefin Copolymer when blended with Linear Low Density Polyethylene and Ethylene n-Butyl Acrylate produces a synergistic balance of properties, e.g. toughness, high shrink and extendability. The optimum blend and the correct choice of resins have exhibited desired performance of the product acceptable to our users.

The narrow molecular weight linear ethylene-alpha olefin copolymer having a density of less than 0.900 g/cc which is employed in the core or substrate layer in this invention and which gives the previously discussed properties (i.e. those copolymers produced by modified Ziegler-Natta catalyst or produced by single-site metallocene catalyst or "CGCT" resins) can also be used in other layers (e.g. sealant and/or abuse) if desired.

The embodiments of the Invention in which an exclusive property or privilege is claimed are defined as follows:

1. A multi-layer, oriented, heat shrinkable thermoplastic film comprising:
   (i) a first layer comprising an ethylene-vinyl acetate copolymer or a linear ethylene-alpha-olefin copolymer or a blend of an ethylene-vinyl acetate copolymer and a linear ethylene-alpha-olefin copolymer; and
   (ii) a second layer comprising a blend of (a) a linear ethylene-alpha olefin copolymer; (b) a material selected from the group consisting of ethylene-vinyl acetate copolymers, ethylene-butyl acrylate copolymers, ethylene-methyl acrylate copolymers, ethylene-methyl methacrylate copolymers, ethylene-acrylic acid copolymers, ethylene-methacrylic acid copolymer and ethylene-carbon monoxide copolymers; and (c) homogeneous linear ethylene-alpha-olefin copolymer having a density of less than 0.900 g/cc.

2. A film according to claim 1 wherein the first layer comprises a blend of an ethylene-vinyl acetate copolymer and a linear ethylene-alpha-olefin copolymer.

3. A film according to claim 1 wherein the linear ethylene-alpha-elfin copolymer present in the first layer has a density of about 0.920 g/cc.

4. A film according to claim 1, wherein the second layer has a thickness greater than the thickness of the first layer.

5. A film according to claim 1 which comprises a further layer of material resistant to oxygen transmission.

6. A film according to claim 5 wherein the material resistant to oxygen transmission comprises a copolymer of vinylidene chloride.

7. A film according to claim 5 wherein the material resistant to oxygen transmission comprises a copolymer of vinylidene chloride and vinyl chloride.

8. A film according to claim 5 wherein the material resistant to oxygen transmission comprises a copolymer of vinylidene chloride and methyl acrylate.

9. A film according to claim 5 wherein the material resistant to oxygen transmission comprises a copolymer of ethylene-vinyl acetate in which the acetate moieties have been partially or completely hydrolyzed.

10. A film according to any one of claims 1 to 3 or 5 to 9 which comprises a further layer comprising a thermoplastic polymeric material.

11. A film according to claim 10 wherein said further layer comprises a copolymer of ethylene-vinyl acetate or a blend comprising ethylene-vinyl acetate and linear ethylene-alpha-olefin copolymer.

12. A film according to claim 4 wherein:
   the first layer comprises a blend of ethylene-vinyl acetate copolymer and the linear ethylene-alpha-olefin copolymer;
   the second layer comprises: (a) a linear low density polyethylene; (b) a material selected from the group consisting of ethylene-vinyl acetate copolymers and ethylene-n-butyl acrylate copolymers; and (c) a homogeneous linear ethylene-alpha-olefin copolymer having a density of less than 0.900 g/cc;
   and wherein the film further comprises:
      a third layer comprising a vinylidene chloride copolymer or an ethylene-vinyl acetate copolymer in which the acetate moieties have been partially or completely hydrolyzed; and
      a fourth layer comprising a copolymer of ethylene-vinyl acetate or a blend of ethylene-vinyl acetate copolymer and ethylene-alpha-olefin copolymer.

13. A film according to claim 12 wherein in the first layer the ethylene-vinyl acetate copolymer has a vinyl acetate content of about 6%, and the blend comprises about 90% by weight of the ethylene-vinyl acetate copolymer and about 10% by weight of the linear ethylene-alpha-olefin copolymer.

14. A film according to claim 12 wherein (c) in the second layer comprises a homogeneous linear ethylene-alpha-olefin copolymer having a density of about 0.885 g/cc.

15. A film according to claim 12 wherein (c) in the second layer comprises a homogeneous linear ethylene-alpha-olefin copolymer having a density of between about 0.860 g/cc and less than 0.900 g/cc.

16. A film according to claim 12 wherein the second layer comprises: (a) about 50% by weight of the layer of a linear ethylene-octene copolymer, (b) about 20% by weight of the layer of an ethylene-n-butyl acrylate copolymer and (c) about 30% by weight of the layer of the homogeneous linear ethylene-alpha-olefin copolymer.

17. A film according to claim 12 wherein (b) in the second layer comprises an ethylene-vinyl acetate copolymer that has a vinyl acetate content of about 18% by weight.

18. A film according to claim 16 wherein the ethylene-n-butyl acrylate copolymer has a butyl acrylate content of about 18.5% by weight.

19. A film according to any one of claims 12 to 18 wherein the third layer comprises a copolymer of vinylidene chloride and methyl acrylate and the fourth layer comprises an ethylene-vinyl acetate copolymer.

20. A film according to claim 19 wherein in the third layer the copolymer of vinylidene chloride and methyl acrylate contains about 91.5% by weight of vinylidene chloride and about 8.5% by weight of methyl acrylate, and in the fourth layer the ethylene-vinyl acetate copolymer has a vinyl acetate content of about 9%.

21. A film according to any one of claims 1 to 9, or 12 to 18, wherein the homogeneous linear ethylene-alpha-olefin copolymer comprises a constrained geometry catalyst technology resin or a single site metallocene catalyzed resin.

22. A bag comprising a film according to any one of claims 1 to 9 or 12 to 18.

23. A film according to claim 21 wherein the homogeneous linear ethylene alpha-olefin copolymer comprises a constrained geometry catalyst technology resin.

24. A film according to claim 21 wherein the homogeneous linear ethylene alpha-olefin copolymer comprises a single-site metallocene catalyzed resin.

25. The film according to claim 1, wherein in the second layer, the linear ethylene-alpha olefin copolymer has a density of from about 0.91 to 0.94 g/cc.

26. The film according to claim 25, wherein in the second layer, the linear ethylene-alpha olefin copolymer has a density of from about 0.912 to 0.928 g/cc.

27. The film according to claim 1, wherein in the second layer, the linear ethylene-alpha olefin copolymer comprises linear low density polyethylene.

28. The film according to claim 1, wherein in the second layer, the linear ethylene-alpha olefin copolymer comprises low density polyethylene.

29. The film according to claim 1, wherein in the second layer, the linear ethylene-alpha olefin copolymer comprises a copolymer of ethylene and at least one member selected from the group consisting of $C_4$-olefin, $C_6$-olefin, and $C_8$-olefin.

* * * * *